US010621979B2

(12) United States Patent
Tang

(10) Patent No.: US 10,621,979 B2
(45) Date of Patent: Apr. 14, 2020

(54) SPEECH RECOGNITION METHOD AND MOBILE TERMINAL

(71) Applicant: Huawei Technologies Co., Ltd., Shenzhen (CN)

(72) Inventor: Weidong Tang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 91 days.

(21) Appl. No.: 15/288,807

(22) Filed: Oct. 7, 2016

(65) Prior Publication Data

US 2017/0025121 A1    Jan. 26, 2017

Related U.S. Application Data

(63) Continuation of application No. PCT/CN2014/090109, filed on Oct. 31, 2014.

(30) Foreign Application Priority Data

Apr. 8, 2014   (CN) .......................... 2014 1 0138393

(51) Int. Cl.
*G10L 15/20* (2006.01)
*G10L 15/22* (2006.01)
(Continued)

(52) U.S. Cl.
CPC .............. *G10L 15/20* (2013.01); *G10L 15/22* (2013.01); *G10L 17/06* (2013.01); (Continued)

(58) Field of Classification Search
USPC .................. 704/231–233, 246, 247, 251, 252
See application file for complete search history.

(56) References Cited

U.S. PATENT DOCUMENTS 8,540,650 B2 *   9/2013   Salmi ...................... A61B 5/1118
                                                        600/534
9,294,859 B2 *   3/2016   Ivanov ................. H04R 29/005
(Continued)

FOREIGN PATENT DOCUMENTS

CN          1488134 A       4/2004
CN        101625871 A       1/2010
(Continued)

OTHER PUBLICATIONS

Machine Translation and Abstract of Chinese Publication No. CN103928025, Jul. 16, 2014, 4 pages.
(Continued)

*Primary Examiner* — Leonard Saint Cyr
(74) *Attorney, Agent, or Firm* — Conley Rose, P.C.

(57) ABSTRACT

A speech recognition method and a mobile terminal relate to the field of electronic and information technologies, and can flexibly perform speech collection and improve a speech recognition rate. The method includes acquiring, by a mobile terminal, an orientation/motion status of the mobile terminal, and determining, according to the orientation/motion status, a voice collection apparatus for voice collection; acquiring, by the mobile terminal, a speech signal from the voice collection apparatus; and recognizing, by the mobile terminal, the speech signal. The present disclosure is applied to a scenario in which the mobile terminal performs speech recognition.

19 Claims, 6 Drawing Sheets

(51) Int. Cl.
*G10L 17/06* (2013.01)
*G10L 21/0216* (2013.01)
*G10L 21/0208* (2013.01)
*G10L 15/18* (2013.01)

(52) U.S. Cl.
CPC ...... *G10L 21/0216* (2013.01); *G10L 15/1815* (2013.01); *G10L 21/0208* (2013.01); *G10L 2015/226* (2013.01); *G10L 2021/02166* (2013.01)

(56) References Cited

U.S. PATENT DOCUMENTS

| | | | |
|---|---|---|---|
| 9,491,559 B2* | 11/2016 | Anderson | A61B 5/11 |
| 2004/0141622 A1* | 7/2004 | Squibbs | H04S 7/40 |
| | | | 381/61 |
| 2007/0136064 A1 | 6/2007 | Carroll | |
| 2008/0298599 A1 | 12/2008 | Kim | |
| 2009/0227888 A1* | 9/2009 | Salmi | A61B 5/1118 |
| | | | 600/534 |
| 2010/0041447 A1 | 2/2010 | Graylin | |
| 2011/0019846 A1* | 1/2011 | Anderson | A61B 5/121 |
| | | | 381/313 |
| 2012/0327115 A1* | 12/2012 | Chhetri | H04R 3/005 |
| | | | 345/633 |
| 2013/0035941 A1* | 2/2013 | Kim | G06F 3/017 |
| | | | 704/275 |
| 2013/0156198 A1* | 6/2013 | Kim | H04R 1/323 |
| | | | 381/17 |
| 2013/0156201 A1* | 6/2013 | Nakai | H04R 5/04 |
| | | | 381/17 |
| 2013/0247117 A1* | 9/2013 | Yamada | G08C 17/02 |
| | | | 725/93 |
| 2013/0294617 A1 | 11/2013 | Alberth, Jr. | |
| 2014/0029761 A1* | 1/2014 | Maenpaa | H04R 3/005 |
| | | | 381/92 |
| 2014/0029775 A1* | 1/2014 | Anderson | A61B 5/11 |
| | | | 381/309 |
| 2014/0156281 A1* | 6/2014 | Boyd | H04L 12/281 |
| | | | 704/275 |
| 2014/0198918 A1* | 7/2014 | Li | H04S 7/30 |
| | | | 381/26 |
| 2014/0270248 A1* | 9/2014 | Ivanov | H04R 3/005 |
| | | | 381/92 |
| 2014/0364056 A1* | 12/2014 | Belk | H04B 5/0031 |
| | | | 455/41.1 |
| 2015/0006161 A1* | 1/2015 | Ren | H04M 1/7255 |
| | | | 704/201 |
| 2015/0148011 A1* | 5/2015 | Chen | H04L 51/04 |
| | | | 455/412.2 |

FOREIGN PATENT DOCUMENTS

| | | |
|---|---|---|
| CN | 102820032 A | 12/2012 |
| CN | 103079013 A | 5/2013 |
| CN | 103079148 A | 5/2013 |
| CN | 103558916 A | 2/2014 |
| CN | 203482246 U | 3/2014 |
| CN | 103928025 A | 7/2014 |
| EP | 1998320 B1 | 11/2010 |
| JP | 20130170936 A | 9/2013 |

OTHER PUBLICATIONS

Machine Translation and Abstract of Chinese Publication No. CN203482246, Mar. 12, 2014, 12 pages.
Foreign Communication From a Counterpart Application, Chinese Application No. 201410138393.2, Chinese Office Action dated May 5, 2016, 10 pages.
Foreign Communication From a Counterpart Application, PCT Application No. PCT/CN2014/090109, English Translation of International Search Report dated Feb. 9, 2015, 3 pages.
Foreign Communication From a Counterpart Application, PCT Application No. PCT/CN2014/090109, English Translation of Written Opinion dated Feb. 9, 2015, 10 pages.

* cited by examiner

SPEECH RECOGNITION METHOD AND MOBILE TERMINAL

CROSS-REFERENCE TO RELATED APPLICATIONS

This application is a continuation of International Application No. PCT/CN2014/090109, filed on Oct. 31, 2014, which claims priority to Chinese Patent Application No. 201410138393.2, filed on Apr. 8, 2014. The disclosures of the aforementioned applications are hereby incorporated by reference in their entireties.

TECHNICAL FIELD

The present disclosure relates to the field of electronic and information technologies, and in particular, to a speech recognition method and a mobile terminal.

BACKGROUND

At the current stage, speech recognition technologies are more widely applied to mobile terminals, for example, speech input and speech control. However, ambient noise and ambient interference affect speech recognition and reduce a rate at which a mobile terminal recognizes speech. To eliminate impact of ambient noise and ambient interference on speech recognition, a microphone array may be installed on a mobile terminal, and the mobile terminal performs a synchronous addition operation on acquired voice signals to strengthen target voice, or may perform a synchronous subtraction operation on voice signals acquired by the microphone array to suppress noise, so as to recognize the processed voice signals.

However, when a distance between a user and a mobile terminal is relatively long, it is difficult to distinguish voice of the user and ambient noise, and the mobile terminal usually processes the voice of the user as ambient noise, which results in that a recognition rate of a processed speech signal decreases.

SUMMARY

Embodiments of the present disclosure provide a speech recognition method and a mobile terminal, which can perform speech collection and recognition in a more flexible manner, and improve a recognition rate of a speech signal.

The following technical solutions are used in the embodiments of the present disclosure.

According to a first aspect, an embodiment of the present disclosure provides a speech recognition method, including acquiring, by a mobile terminal, a distance to a user, and determining, according to the distance to the user, a voice collection apparatus for voice collection, where the voice collection apparatus includes a microphone array in the mobile terminal or a wearable voice collection apparatus; acquiring, by the mobile terminal, a speech signal from the voice collection apparatus, where the speech signal is obtained by converting voice collected by the voice collection apparatus; and recognizing, by the mobile terminal, the speech signal.

With reference to the first aspect, in a first possible implementation manner, the determining, according to the distance to the user, a voice collection apparatus for voice collection includes determining whether the distance is less than a distance threshold, and if the distance is less than the distance threshold, determining to use the microphone array as the voice collection apparatus, and the acquiring, by the mobile terminal, a speech signal from the voice collection apparatus includes acquiring, by the mobile terminal, the speech signal using the microphone array in the mobile terminal, where the speech signal is obtained by converting voice collected by the microphone array.

With reference to the first aspect or the first possible implementation manner of the first aspect, in a second possible implementation manner, the determining, according to the distance to the user, a voice collection apparatus for voice collection includes determining whether the distance is less than the distance threshold, and if the distance is not less than the distance threshold, determining to use the wearable voice collection apparatus as the voice collection apparatus, the acquiring, by the mobile terminal, a speech signal from the voice collection apparatus includes acquiring, by the mobile terminal, the speech signal using the wearable voice collection apparatus, where the speech signal is obtained by converting voice collected by the wearable voice collection apparatus, and the recognizing, by the mobile terminal, the speech signal includes performing, by the mobile terminal, voiceprint recognition and semantic recognition on the acquired speech signal.

According to a second aspect, an embodiment of the present disclosure provides a speech recognition method, including acquiring, by a mobile terminal, an orientation/motion status of the mobile terminal, and determining, according to the orientation/motion status, a voice collection apparatus for voice collection, where the orientation/motion status indicates an orientation or a motion status of the mobile terminal, and the voice collection apparatus includes a microphone array in the mobile terminal or a wearable voice collection apparatus; acquiring, by the mobile terminal, a speech signal from the voice collection apparatus, where the speech signal is obtained by converting voice collected by the voice collection apparatus; and recognizing the speech signal, for example, performing voiceprint recognition and semantic recognition.

With reference to the second aspect, in a first possible implementation manner, the orientation/motion status includes at least a proximity distance, and the determining, according to the orientation/motion status, a voice collection apparatus for voice collection includes collecting, by the mobile terminal, voice using the microphone array in the mobile terminal, and acquiring the speech signal from the microphone array if the proximity distance is less than or equal to a first threshold.

With reference to the second aspect, in a second possible implementation manner, the orientation/motion status includes at least a proximity distance, and the determining, according to the orientation/motion status, a voice collection apparatus for voice collection includes collecting, by the mobile terminal, voice using the wearable voice collection apparatus, acquiring the speech signal from the wearable voice collection apparatus, and processing the speech signal if the proximity distance is greater than a first threshold.

With reference to the second aspect, in a third possible implementation manner, the orientation/motion status includes at least a proximity distance and a proximity distance change rate, and the determining, according to the orientation/motion status, a voice collection apparatus for voice collection includes collecting, by the mobile terminal, voice using the microphone array in the mobile terminal, and acquiring the speech signal from the microphone array if the proximity distance is less than or equal to a first threshold and the proximity distance change rate is less than or equal to a second threshold.

With reference to the second aspect, in a fourth possible implementation manner, the orientation/motion status includes at least a proximity distance and a proximity distance change rate, and the determining, according to the orientation/motion status, a voice collection apparatus for voice collection includes collecting, by the mobile terminal, voice using the wearable voice collection apparatus, acquiring the speech signal from the wearable voice collection apparatus if the proximity distance is greater than a first threshold or the proximity distance change rate is greater than a second threshold, and processing the speech signal.

With reference to the second aspect, in a fifth possible implementation manner, the orientation/motion status includes a proximity distance, a proximity distance change rate, a horizontal tilt, a horizontal tilt change rate, an acceleration change rate, and an azimuth change rate, and the determining, according to the orientation/motion status, a voice collection apparatus for voice collection includes collecting, by the mobile terminal, voice using the microphone array in the mobile terminal if the proximity distance is less than or equal to a first threshold, the proximity distance change rate is less than or equal to a second threshold, the horizontal tilt is within a preset range, the horizontal tilt change rate is less than or equal to a third threshold, the acceleration change rate is less than or equal to a fourth threshold, and the azimuth change rate is less than or equal to a fifth threshold, using and acquiring the speech signal from the microphone array in the mobile terminal.

With reference to the second aspect, in a sixth possible implementation manner, the orientation/motion status includes a proximity distance, a proximity distance change rate, a horizontal tilt, a horizontal tilt change rate, an acceleration change rate, and an azimuth change rate, and the determining, according to the orientation/motion status, a voice collection apparatus for voice collection includes, if the proximity distance is greater than a first threshold, the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, collecting, by the mobile terminal, voice using the wearable voice collection apparatus, acquiring the speech signal from the wearable voice collection apparatus, and processing the speech signal.

With reference to the second aspect, in a seventh possible implementation manner, the orientation/motion status includes a proximity distance, a proximity distance change rate, a horizontal tilt, a horizontal tilt change rate, an acceleration change rate, and an azimuth change rate, and the determining, according to the orientation/motion status, a voice collection apparatus for voice collection includes detecting whether the proximity distance is greater than a first threshold if the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, and acquiring, by the mobile terminal, the speech signal from the wearable voice collection apparatus if the proximity distance is greater than the first threshold, and processing the speech signal.

With reference to the second aspect, in an eighth possible implementation manner, the orientation/motion status includes a proximity distance, a proximity distance change rate, a horizontal tilt, a horizontal tilt change rate, an acceleration change rate, and an azimuth change rate, the determining, according to the orientation/motion status, a voice collection apparatus for voice collection includes, if the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, detecting whether the proximity distance is greater than a first threshold, and collecting, by the mobile terminal, voice using the microphone array in the mobile terminal and the wearable voice collection apparatus if the proximity distance is less than or equal to the first threshold, and acquiring a mixed speech signal, and processing the mixed speech signal, where the mixed speech signal is obtained by converting voice collected by the microphone array in the mobile terminal and the wearable voice collection apparatus.

According to a third aspect, an embodiment of the present disclosure provides a mobile terminal that includes a microphone array, where the mobile terminal includes a collection apparatus determining module configured to acquire a distance to a user, and determine, according to the distance to the user, a voice collection apparatus for voice collection, where the voice collection apparatus includes the microphone array in the mobile terminal or a wearable voice collection apparatus; a speech acquiring module configured to acquire a speech signal from the voice collection apparatus, where the speech signal is obtained by converting voice collected by the voice collection apparatus; and a speech recognition module configured to recognize the speech signal.

With reference to the third aspect, in a first possible implementation manner, the collection apparatus determining module is configured to acquire a distance to a user, determine whether the distance is less than a distance threshold, and if the distance is less than the distance threshold, determine to use the microphone array as the voice collection apparatus, and the speech acquiring module is configured to acquire the speech signal using the microphone array in the mobile terminal, where the speech signal is obtained by converting voice collected by the microphone array.

With reference to the third aspect or the first possible implementation manner of the third aspect, in a second possible implementation manner, the collection apparatus determining module is configured to acquire a distance to a user, determine whether the distance is less than a distance threshold, and if the distance is not less than the distance threshold, determine to use the wearable voice collection apparatus as the voice collection apparatus; the speech acquiring module is configured to acquire the speech signal using the wearable voice collection apparatus, where the speech signal is obtained by converting voice collected by the wearable voice collection apparatus; and the speech acquiring module is configured to perform voiceprint recognition and semantic recognition on the acquired speech signal.

According to a fourth aspect, an embodiment of the present disclosure provides a mobile terminal that includes a microphone array, where the mobile terminal includes a collection apparatus determining module configured to acquire an orientation/motion status of the mobile terminal, and determine, according to the orientation/motion status, a voice collection apparatus for voice collection, where the orientation/motion status indicates an orientation or a motion status of the mobile terminal, and the voice collection apparatus includes a wearable voice collection apparatus or the microphone array; a speech acquiring module configured to acquire a speech signal from the voice collection apparatus, where the speech signal is obtained by converting voice collected by the voice collection apparatus; and a speech recognition module configured to recognize the speech signal.

With reference to the fourth aspect, in a first possible implementation manner, the orientation/motion status includes at least a proximity distance, and the collection apparatus determining module is configured to acquire the proximity distance, and if the proximity distance is less than or equal to a first threshold, determine to collect voice using the microphone array.

With reference to the fourth aspect, in a second possible implementation manner, the orientation/motion status includes at least a proximity distance, and the collection apparatus determining module is configured to acquire the proximity distance, and if the proximity distance is greater than a first threshold, determine to collect voice using the wearable voice collection apparatus.

With reference to the fourth aspect, in a third possible implementation manner, the orientation/motion status includes at least a proximity distance and a proximity distance change rate, and the collection apparatus determining module is configured to acquire the proximity distance and the proximity distance change rate, and if the proximity distance is less than or equal to a first threshold, and the proximity distance change rate is less than or equal to a second threshold, determine to collect voice using the microphone array.

With reference to the fourth aspect, in a fourth possible implementation manner, the orientation/motion status includes at least a proximity distance and a proximity distance change rate, and the collection apparatus determining module is configured to acquire the proximity distance and the proximity distance change rate, and if the proximity distance is greater than a first threshold, or the proximity distance change rate is greater than a second threshold, determine to collect voice using the wearable voice collection apparatus.

With reference to the fourth aspect, in a fifth possible implementation manner, the orientation/motion status includes a proximity distance, a proximity distance change rate, a horizontal tilt, a horizontal tilt change rate, an acceleration change rate, and an azimuth change rate, and the collection apparatus determining module is configured to acquire the proximity distance, the proximity distance change rate, the horizontal tilt, the horizontal tilt change rate, the acceleration change rate, and the azimuth change rate, and if the proximity distance is less than or equal to a first threshold, the proximity distance change rate is less than or equal to a second threshold, the horizontal tilt is within a preset range, the horizontal tilt change rate is less than or equal to a third threshold, the acceleration change rate is less than or equal to a fourth threshold, and the azimuth change rate is less than or equal to a fifth threshold, determine to collect voice using the microphone array.

With reference to the fourth aspect, in a sixth possible implementation manner, the orientation/motion status includes a proximity distance, a proximity distance change rate, a horizontal tilt, a horizontal tilt change rate, an acceleration change rate, and an azimuth change rate, and the collection apparatus determining module is configured to acquire the proximity distance, the proximity distance change rate, the horizontal tilt, the horizontal tilt change rate, the acceleration change rate, and the azimuth change rate, and if the proximity distance is greater than a first threshold, the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, determine to collect voice using the wearable voice collection apparatus.

With reference to the fourth aspect, in a seventh possible implementation manner, the orientation/motion status includes a proximity distance, a proximity distance change rate, a horizontal tilt, a horizontal tilt change rate, an acceleration change rate, and an azimuth change rate, and the collection apparatus determining module is configured to acquire the proximity distance, the proximity distance change rate, the horizontal tilt, the horizontal tilt change rate, the acceleration change rate, and the azimuth change rate, if the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, detect whether the proximity distance is greater than a first threshold, and if the proximity distance is greater than the first threshold, determine to collect voice using the wearable voice collection apparatus.

With reference to the fourth aspect, in an eighth possible implementation manner, the orientation/motion status includes a proximity distance, a proximity distance change rate, a horizontal tilt, a horizontal tilt change rate, an acceleration change rate, and an azimuth change rate, and the collection apparatus determining module is configured to acquire the proximity distance, the proximity distance change rate, the horizontal tilt, the horizontal tilt change rate, the acceleration change rate, and the azimuth change rate, if the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, detect whether the proximity distance is greater than a first threshold, and if the proximity distance is less than or equal to the first threshold, determine to collect voice using the microphone array in the mobile terminal and the wearable voice collection apparatus, and acquire a mixed speech signal.

According to the speech recognition method and the mobile terminal provided in the embodiments of the present disclosure, a mobile terminal can acquire an orientation/motion status of the mobile terminal, and determine, according to the orientation/motion status, a voice collection apparatus for voice collection; acquire a speech signal from the voice collection apparatus; and perform voiceprint recognition and semantic recognition on the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, which improves a precision rate of speech recognition.

DESCRIPTION OF EMBODIMENTS

Figure 1:
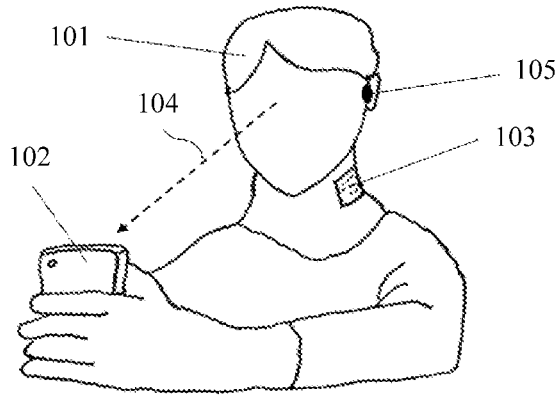
FIG. 1 is a schematic diagram of a speech recognition system according to an embodiment of the present disclosure.

The technical solutions provided in the embodiments of the present disclosure are applied to a speech recognition system, and can use a suitable voice collection apparatus to collect voice in different scenarios and generate a speech signal that is needed to perform speech recognition and semantic recognition. A schematic diagram of the speech recognition system is shown in FIG. 1. When a mobile terminal 102 starts an application such as speech recognition application and speech assistance application, the mobile terminal 102 selects a suitable voice collection apparatus according to a change 104 of a distance to a user 101 or another orientation/motion status of the mobile terminal 102. The voice collection apparatus includes a microphone array in the mobile terminal and a wearable voice collection apparatus, and the wearable voice collection apparatus may be an electronic skin tattoo 103, or may be a bone conduction microphone 105, as shown in FIG. 1.

Figure 2A:
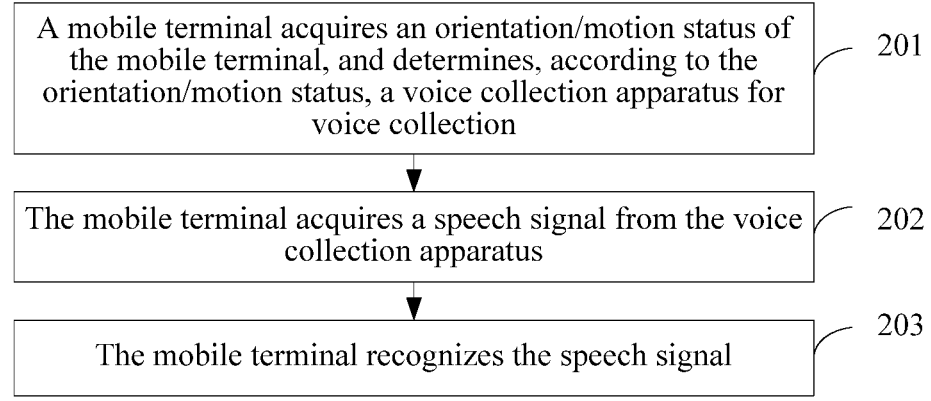
FIG. 2A is a flowchart of a speech recognition method according to an embodiment of the present disclosure.

An embodiment of the present disclosure provides a speech recognition method. As shown in FIG. 2A, the method includes:

201. A mobile terminal acquires an orientation/motion status of the mobile terminal, and determines, according to the orientation/motion status, a voice collection apparatus for voice collection.

The orientation/motion status indicates an orientation or a motion status of the mobile terminal. The voice collection apparatus includes a microphone array in the mobile terminal or a wearable voice collection apparatus. The wearable voice collection apparatus may be an electronic skin tattoo worn on the throat of a user, or may be a bone conduction microphone worn in a cochlea, or the like. The mobile terminal selects, according to the orientation/motion status of the mobile terminal, a voice collection apparatus for voice collection.

It should be noted that the mobile terminal may communicate with the wearable voice collection apparatus using a short-range wireless communication manner, where the short-range wireless communication manner may be a communication manner such as ZigBee®, Ultra-Wideband (UWB), wireless local area network (WLAN or Wi-Fi), Bluetooth, or Near Field Communication (NFC). The mobile terminal communicates with the wearable voice collection apparatus using a short-range wireless communication manner, which may be implemented by predefining a connection relationship, for example, performing pairing setting in advance, or entering a password to authenticate a connection between the mobile terminal and the wearable voice collection apparatus.

Optionally, the orientation/motion status includes at least a proximity distance, and the orientation/motion status may further include a proximity distance change rate, a horizontal tilt, a horizontal tilt change rate, an acceleration change rate, an azimuth change rate, and the like. It should be noted that the orientation/motion status may be measured using various sensors, for example, sensors such as a proximity sensor, an acceleration sensor, and an electronic compass sensor, in the mobile terminal. The proximity sensor usually includes a transmitter-detector pair, and an infrared or ultrasonic transmitter and an infrared or ultrasonic detector may be combined. A transmitter transmits an optical signal, and a detector receives an optical signal obtained when a detected target reflects or scatters the optical signal transmitted by the transmitter, and estimates a distance between the detector and the detected target according to strength of the optical signal. The proximity sensor usually detects a stationary or a moving object, when a detected target is near or far away from the proximity sensor, the detector detects an increase or a decrease of light intensity, and when the detector detects no returned light intensity, it can be determined that the detected target does not exist or is far away, where in this solution, the detected target may be a user.

202. The mobile terminal acquires a speech signal from the voice collection apparatus.

The speech signal is obtained by converting voice collected by the voice collection apparatus. The mobile terminal selects a suitable voice collection apparatus according to the orientation/motion status of the mobile terminal that is acquired in step 201, collects voice using the voice collection apparatus, and obtains the speech signal by converting the collected voice.

203. The mobile terminal recognizes the speech signal.

The speech signal may be recognized using a voiceprint recognition and semantic recognition technology, and voiceprint recognition and semantic recognition may be performed on the speech signal using a conventional means.

According to the speech recognition method provided in this embodiment of the present disclosure, a mobile terminal can acquire an orientation/motion status of the mobile terminal, and determine, according to the orientation/motion status, a voice collection apparatus for voice collection; acquire a speech signal from the voice collection apparatus; and recognize the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal.

Figure 2B:
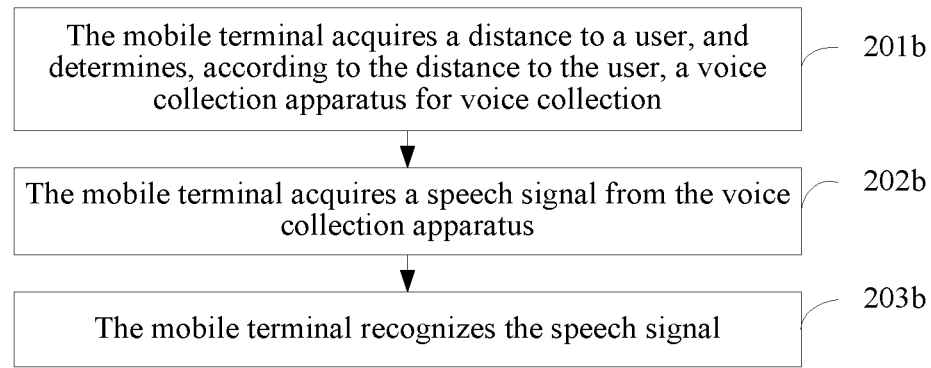
FIG. 2B is a flowchart of a specific implementation manner of a speech recognition method according to an embodiment of the present disclosure.

As a more specific solution of the foregoing embodiment, in a case in which a distance between a mobile terminal and a user is used as an orientation/motion status, as shown in FIG. 2B, the speech recognition method provided in this embodiment of the present disclosure includes:

201b. The mobile terminal acquires a distance to a user, and determines, according to the distance to the user, a voice collection apparatus for voice collection.

The voice collection apparatus includes a microphone array in the mobile terminal or a wearable voice collection apparatus. The mobile terminal can detect the distance to the user using a sensor. For example, the distance between the mobile terminal and the user is determined by detecting a moving status or a location of the user. Alternatively, the user carries an accessory module, and the distance between the mobile terminal and the user is determined by detecting a distance between the mobile terminal and the module.

In a specific application of this embodiment, in a manner, the distance to the user is determined, and if the distance to the user is less than a distance threshold, it is determined that voice is to be collected using the microphone array, and in another manner, the distance to the user is determined, and if the distance to the user is not less than a distance threshold, it is determined that voice is to be collected using the wearable voice collection apparatus.

202b. The mobile terminal acquires a speech signal from the voice collection apparatus.

The speech signal is obtained by converting voice collected by the voice collection apparatus.

203b. The mobile terminal recognizes the speech signal.

If voice is to be collected using the wearable voice collection apparatus, the wearable voice collection apparatus may be an electronic skin tattoo worn on the throat of a user, or may be a bone conduction microphone worn in a cochlea. The speech signal may be recognized by means of voiceprint recognition and semantic recognition, and in this embodiment, the mobile terminal can recognize voice more accurately, and also determine a voice source more accurately.

Figure 3A:
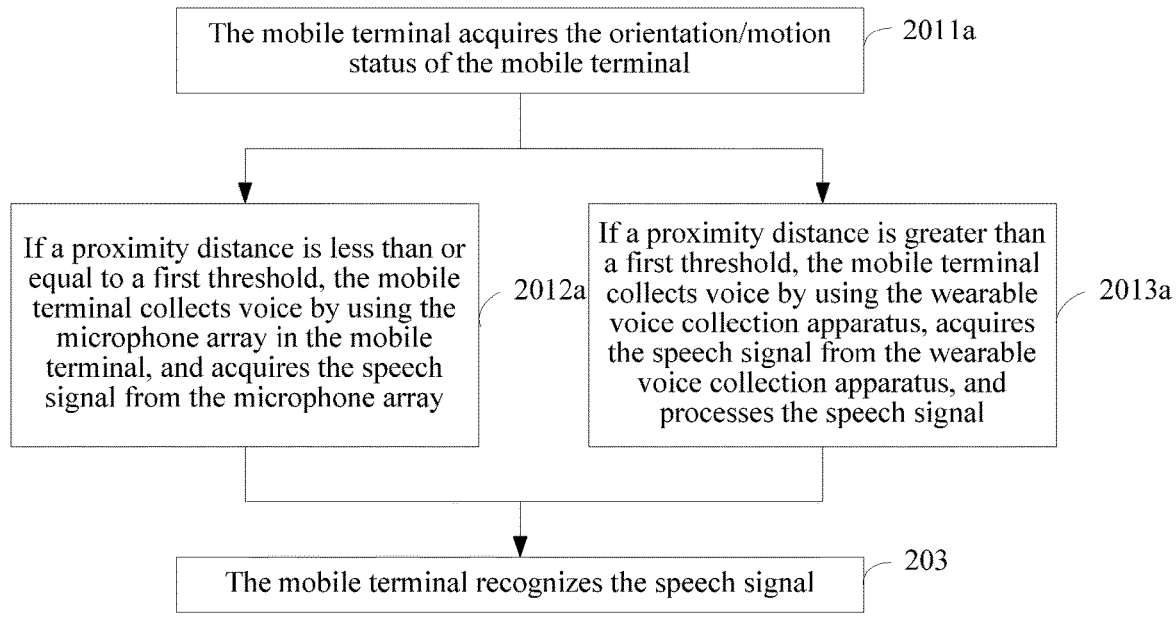
FIG. 3A is a flowchart of a specific implementation manner of a speech recognition method according to an embodiment of the present disclosure.

Further, in a specific implementation manner, based on the solution shown in FIG. 2A, this embodiment of the present disclosure further provides a specific solution of the speech recognition method, and in this solution, the orientation/motion status includes at least a proximity distance and a proximity distance change rate. In this solution, a process of performing step 201 in the solution shown in FIG. 2A is described in further detail, and step 201 may be implemented as steps 2011a to 2013a. As shown in FIG. 3A, step 201 includes:

2011a. The mobile terminal acquires the orientation/motion status of the mobile terminal.

The orientation/motion status includes at least the proximity distance, and the proximity distance is usually a distance between the face or another part of a user to the mobile terminal.

2012a. If the proximity distance is less than or equal to a first threshold, the mobile terminal collects voice using the microphone array in the mobile terminal, and acquires the speech signal from the microphone array.

The first threshold may be set by the user according to an actual case, or may be automatically set by the mobile terminal according to a history record. The mobile terminal selects the microphone array to collect voice, the microphone array processes the collected voice to obtain the speech signal, and the mobile terminal acquires the speech signal from the microphone array.

2013a. If the proximity distance is greater than a first threshold, the mobile terminal collects voice using the wearable voice collection apparatus, acquires the speech signal from the wearable voice collection apparatus, and processes the speech signal.

It should be noted that the orientation/motion status may be periodically measured using a sensor in the mobile terminal. In this embodiment of the present disclosure, the proximity distance may be periodically measured using a proximity sensor, and the voice collection apparatus for voice collection is selected according to the proximity distance. Preferably, a measurement frequency ranges from 20 hertz (Hz) to 40 Hz. The mobile terminal selects the wearable voice collection apparatus to collect voice, and performs processing to obtain a speech signal corresponding to the collected voice. However, voice of a user is collected using the wearable voice collection apparatus, voice is conducted using visceral tissue of a body, and transmission speeds and energy attenuation rules of voice in different media are different; therefore, characteristics of extracted voice of the user are completely different. Therefore, digital filtering processing needs to be performed on collected voice to recover as much as possible characteristics of the voice as being transmitted through air. In a feasible method, the mobile terminal performs digital filtering processing on voice collected by the wearable voice collection apparatus, and enhances a low-frequency part and suppresses a high-frequency part, to obtain an approximate frequency property of the voice as being transmitted through air, so that an output speech signal has a relatively flat frequency response in a speech frequency band. In another feasible method, after performing digitization processing and a filtering operation on collected voice, the wearable voice collection apparatus sends the processed voice to the mobile terminal using a short-range wireless communications technology, to perform further processing.

In a specific application, the mobile terminal may create a working mode, and use the working mode to associate an orientation/motion status of the mobile terminal with a voice collection apparatus to be used.

In a specific application, a correspondence between data measured by a proximity sensor and a voice collection apparatus for voice collection is shown in Table 1:

TABLE 1

| Proximity sensor | Voice collection apparatus for voice collection |
|---|---|
| In a measurement period, an average value of proximity distances is less than or equal to a first threshold | Microphone array |
| In a measurement period, an average value of proximity distances is greater than a first threshold | Wearable voice collection apparatus |

According to the speech recognition method provided in this embodiment of the present disclosure, a mobile terminal can acquire an orientation/motion status of the mobile terminal, where the orientation/motion status includes at least a proximity distance. When the proximity distance is less than or equal to a first threshold, the mobile terminal collects voice using a microphone array in the mobile terminal, and acquires a speech signal from the microphone array; or when the proximity distance is greater than a first threshold, the mobile terminal collects voice using a wearable voice collection apparatus, acquires a speech signal from the wearable voice collection apparatus, and recognizes the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal, which improves a precision rate of speech recognition.

Figure 3B:
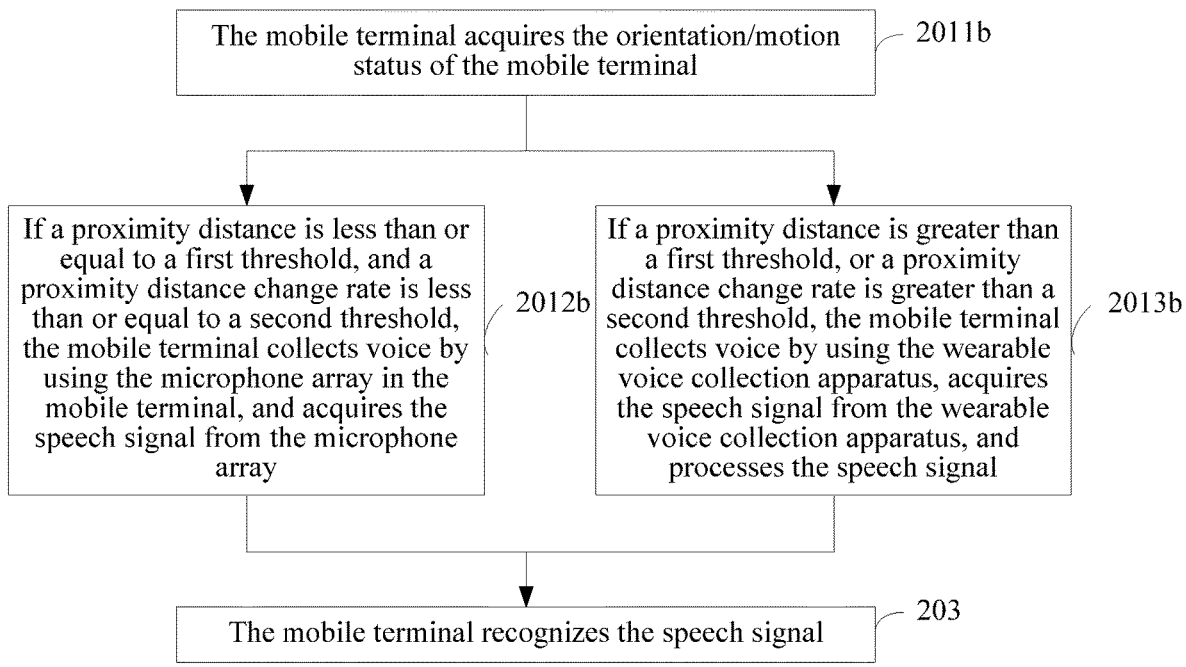
FIG. 3B is a flowchart of another specific implementation manner of a speech recognition method according to an embodiment of the present disclosure.

Further, in a specific implementation manner, based on the solution shown in FIG. 2A, this embodiment of the present disclosure further provides a specific solution of the speech recognition method, and in this solution, the orientation/motion status includes a proximity distance and a proximity distance change rate. In this solution, a process of performing step 201 in the solution shown in FIG. 2A is described in further detail, and step 201 may be implemented as steps 2011b to 2013b. As shown in FIG. 3B, step 201 includes:

2011b. The mobile terminal acquires the orientation/motion status of the mobile terminal.

The orientation/motion status includes the proximity distance and the proximity distance change rate, and the proximity distance is usually a distance between the face or another part of a user to the mobile terminal.

2012b. If the proximity distance is less than or equal to a first threshold, and the proximity distance change rate is less than or equal to a second threshold, the mobile terminal collects voice using the microphone array in the mobile terminal, and acquires the speech signal from the microphone array.

The mobile terminal determines, according to the orientation/motion status of the mobile terminal, a voice collection apparatus to be used. The first threshold and the second threshold may be set by the user according to an actual case, or may be automatically set by the mobile terminal according to a history record. The mobile terminal selects the microphone array to collect voice, the microphone array processes the collected voice to obtain the speech signal, and the mobile terminal acquires the speech signal from the microphone array.

It should be noted that the orientation/motion status may be measured using various sensors in the mobile terminal. A proximity sensor in the mobile terminal periodically performs measurement, and obtains by means of calculation a proximity distance change rate that is in multiple continuous measurement periods. For example, a measurement frequency is 40 Hz, that is, a measurement period is 1.5 seconds (s). Preferably, a measurement frequency ranges from 20 Hz to 40 Hz.

In a specific application, the mobile terminal may create a working mode, and use the working mode to associate an orientation/motion status of the mobile terminal with a voice collection apparatus to be used. For example, the mobile terminal creates a working mode A, when a proximity sensor of the mobile terminal discovers by means of measurement that the proximity distance is less than or equal to the first threshold, and the proximity distance change rate is less than or equal to the second threshold, the working mode A is started, and the mobile terminal collects voice using the microphone array, and acquires the speech signal from the microphone array.

2013b. If the proximity distance is greater than a first threshold, or the proximity distance change rate is greater than a second threshold, the mobile terminal collects voice using the wearable voice collection apparatus, acquires the speech signal from the wearable voice collection apparatus, and processes the speech signal.

The mobile terminal determines, according to the orientation/motion status of the mobile terminal, a voice collection apparatus to be used. The first threshold and the second threshold may be set by the user according to an actual case, or may be automatically set by the mobile terminal according to a history record. The mobile terminal selects the wearable voice collection apparatus to collect voice, and performs processing to obtain a speech signal corresponding to the collected voice. However, voice of a user is collected using the wearable voice collection apparatus, voice is conducted using visceral tissue of a body, and transmission speeds and energy attenuation rules of voice in different media are different; therefore, characteristics of extracted voice of the user are completely different. Therefore, digital filtering processing needs to be performed on collected voice to recover as much as possible characteristics of the voice as being transmitted through air. In a feasible method, the mobile terminal performs digital filtering processing on voice collected by the wearable voice collection apparatus, and enhances a low-frequency part and suppresses a high-frequency part, to obtain an approximate frequency property of the voice as being transmitted through air, so that an output speech signal has a relatively flat frequency response in a speech frequency band. In another feasible method, after performing digitization processing and a filtering operation on collected voice, the wearable voice collection apparatus sends the processed voice to the mobile terminal using a short-range wireless communications technology, to perform further processing.

It should be noted that the orientation/motion status may be measured using various sensors in the mobile terminal. A proximity sensor in the mobile terminal periodically performs measurement, and obtains by means of calculation a proximity distance change rate that is in multiple continuous measurement periods. For example, a measurement frequency is 40 Hz, that is, a measurement period is 1.5 s. Preferably, a measurement frequency ranges from 20 Hz to 40 Hz.

In a specific application, the mobile terminal may create a working mode, and use the working mode to associate an orientation/motion status of the mobile terminal with a voice collection apparatus to be used. For example, the mobile terminal creates a working mode B, when a proximity sensor of the mobile terminal discovers by means of measurement that the proximity distance is greater than the first threshold or the proximity distance change rate is greater than the second threshold, the working mode B is started, and the mobile terminal collects voice using the wearable voice collection apparatus, and acquires, from the wearable voice collection apparatus, the speech signal obtained by means of processing.

The mobile terminal measures related data of the orientation/motion status using a proximity sensor, and the mobile terminal determines, with reference to the data measured by the proximity sensor, the voice collection apparatus for voice collection. For example, when the mobile terminal is turned over by a user, the orientation/motion status of the mobile terminal continuously changes, the detected proximity distance also rapidly changes, and consequently the detected proximity distance change rate is relatively large. When the proximity distance change rate is greater than the second threshold, although the proximity distance is less than or equal to the first threshold, in consideration of both the proximity distance and the proximity distance change rate, the mobile terminal selects the wearable voice collection apparatus to collect voice. In this case, in multiple continuous measurement periods, the mobile terminal determines, according to various suitable preset thresholds and a change rate of data of the orientation/motion status detected by the proximity sensor, the voice collection apparatus to be used by the mobile terminal. In a specific application, a correspondence between data measured by a proximity sensor and a voice collection apparatus for voice collection is shown in Table 2:

TABLE 2

| Proximity sensor | Voice collection apparatus for voice collection |
|---|---|
| In a measurement period, an average value of proximity distances is less than or equal to a first threshold, and a proximity distance change rate is less than or equal to a second threshold | Microphone array |
| In a measurement period, an average value of proximity distances is less than or equal to a first threshold, and a proximity distance change rate is greater than a second threshold In a measurement period, an average value of proximity distances is greater than a first threshold, and a proximity distance change rate is less than or equal to a second threshold In a measurement period, an average value of proximity distances is greater than a first threshold, and a proximity distance change rate is greater than a second threshold | Wearable voice collection apparatus |

According to the speech recognition method provided in this embodiment of the present disclosure, a mobile terminal can acquire an orientation/motion status of the mobile terminal, and determine, according to a proximity distance and a proximity distance change rate in the orientation/motion status, a voice collection apparatus for voice collection; when the proximity distance is less than or equal to a first threshold, and the proximity distance change rate is less than or equal to a second threshold, the mobile terminal collects voice using a microphone array in the mobile terminal, and acquires a speech signal from the microphone array; or when the proximity distance is greater than a first threshold, or the proximity distance change rate is greater than a second threshold, the mobile terminal collects voice using a wearable voice collection apparatus, acquires a speech signal from the wearable voice collection apparatus, and recognizes the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal, which improves a precision rate of speech recognition.

Figure 3C:
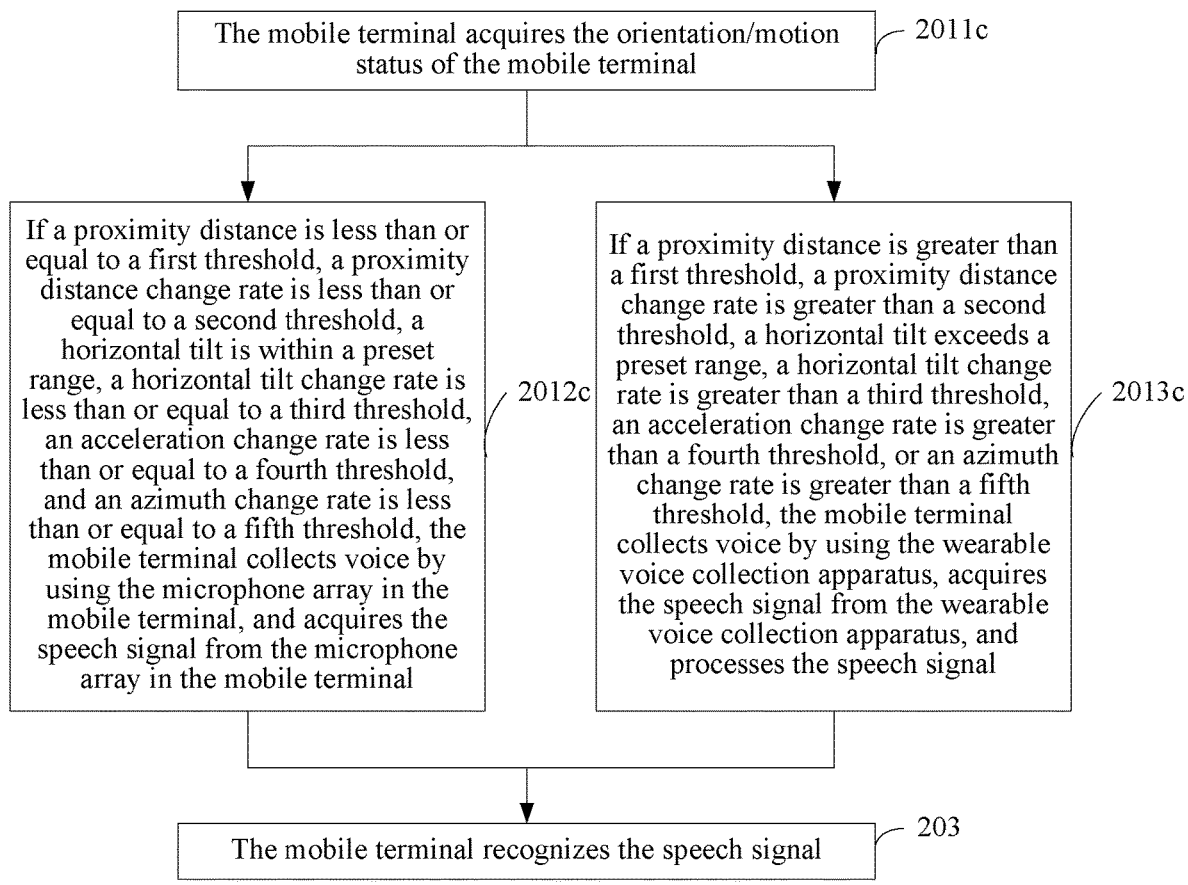
FIG. 3C is a flowchart of still another specific implementation manner of a speech recognition method according to an embodiment of the present disclosure.

Further, in a specific implementation manner, based on the solution shown in FIG. 2A, this embodiment of the present disclosure further provides a specific solution of the speech recognition method, and in this solution, the orientation/motion status includes a proximity distance, a proximity distance change rate, a horizontal tilt, a horizontal tilt change rate, an acceleration change rate, and an azimuth change rate. In this solution, a process of performing step 201 in the solution shown in FIG. 2A is described in further detail, and step 201 may be implemented as steps 2011c to 2013c. As shown in FIG. 3C, step 201 includes:

2011c. The mobile terminal acquires the orientation/motion status of the mobile terminal.

The orientation/motion status includes a proximity distance, a proximity distance change rate, a horizontal tilt, a horizontal tilt change rate, an acceleration change rate, and an azimuth change rate.

2012c. If the proximity distance is less than or equal to a first threshold, the proximity distance change rate is less than or equal to a second threshold, the horizontal tilt is within a preset range, the horizontal tilt change rate is less than or equal to a third threshold, the acceleration change rate is less than or equal to a fourth threshold, and the azimuth change rate is less than or equal to a fifth threshold, the mobile terminal collects voice using the microphone array in the mobile terminal, and acquires the speech signal from the microphone array in the mobile terminal.

The first threshold, the second threshold, the third threshold, the fourth threshold, the fifth threshold, and the preset range of the horizontal tilt may be set by the user according to an actual case, or may be automatically set by the mobile terminal according to a history record.

It should be noted that the orientation/motion status such as the proximity distance, the proximity distance change rate, the horizontal tilt, the horizontal tilt change rate, the acceleration change rate, and the azimuth change rate may be measured using various sensors in the mobile terminal. A proximity sensor, an acceleration sensor, an electronic compass sensor, and the like in the mobile terminal periodically perform measurement, to obtain the proximity distance and the horizontal tilt, and obtains by means of calculation the proximity distance change rate, the horizontal tilt change rate, the acceleration change rate, and the azimuth change rate in multiple continuous measurement periods. For example, a measurement frequency is 40 Hz, that is, a measurement period is 1.5 s. Preferably, a measurement frequency ranges from 20 Hz to 40 Hz.

2013c. If the proximity distance is greater than a first threshold, the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, the mobile terminal collects voice using the wearable voice collection apparatus, acquires the speech signal from the wearable voice collection apparatus, and processes the speech signal.

The mobile terminal may periodically measure data of the orientation/motion status using each sensor, and obtain average values and change rates of proximity distances, horizontal tilts, accelerations, and azimuths in multiple continuous periods. Specifically, a correspondence between data measured by each sensor and a voice collection apparatus for voice collection is shown in Table 3:

TABLE 3

| Proximity sensor | Acceleration sensor | Electronic compass sensor | Voice collection apparatus for voice collection |
|---|---|---|---|
| In a measurement period, an average value of proximity distances is less than or equal to a first threshold, and a proximity distance change rate is less than or equal to a second threshold | In a measurement period, an average value of horizontal tilts is within a preset range, a horizontal tilt change rate is less than or equal to a third threshold, and an acceleration change rate is less than or equal to a fourth threshold | In a measurement period, an azimuth change rate is less than or equal to a fifth threshold | Microphone array |
| | In a measurement period, an average value of horizontal tilts exceeds a preset range, a horizontal tilt change rate is less than or equal to a third threshold, and an acceleration change rate is less than or equal to a fourth threshold | Any case | Wearable voice collection apparatus |
| | In a measurement period, an average value of horizontal tilts is within a preset range, a horizontal tilt change rate is greater than a third threshold, and an acceleration change rate is less than or equal to a fourth threshold | Any case | Wearable voice collection apparatus |
| | In a measurement period, an average value of horizontal tilts is within a preset range, a horizontal tilt change rate is less than or equal to a third threshold, and an acceleration change rate is greater than a fourth threshold | Any case | Wearable voice collection apparatus |
| | Any case | In a measurement period, an azimuth change rate is greater than a fifth threshold | Wearable voice collection apparatus |
| In a measurement period, an average value of proximity distances is less than or equal to a first threshold, and a proximity distance change rate is greater than a second threshold | Any case | Any case | Wearable voice collection apparatus |
| In a measurement period, an average value of proximity distances is greater than a first threshold, and a proximity distance change rate is less than or equal to a second threshold | Any case | Any case | Wearable voice collection apparatus |
| In a measurement period, an average value of proximity distances is greater than a first threshold, and a proximity distance change rate is greater than a second threshold | Any case | Any case | Wearable voice collection apparatus |

The mobile terminal measures related data of the orientation/motion status using various sensors, and the mobile terminal determines, with reference to the data measured by the various sensors, the voice collection apparatus for voice collection. For example, when the mobile terminal is placed on a table with the screen of the mobile terminal facing downwards, the proximity sensor determines that a proximity distance between a measured target and the mobile terminal is very short in multiple continuous measurement periods, but the mobile terminal does not immediately determine that a working mode is a short-range mode, and instead, reads data measured by the acceleration sensor and the electronic compass sensor in the multiple continuous measurement periods, to assist in determining an actual case of the mobile terminal. The acceleration sensor may recognize that the horizontal tilt of the mobile terminal is approximately 360 degrees instead of 60 degrees to 165 degrees in normal use of the mobile terminal. In this case, the mobile terminal selects the wearable voice collection apparatus to collect voice. For another example, in a case in which a table on which the mobile terminal is placed shakes, or the mobile terminal vibrates to prompt an incoming call, to avoid interference, it is unsuitable to use the speech signal acquired from the microphone array to perform speech recognition and a speech service. In this case, the acceleration sensor detects a vibration signal in multiple continuous measurement periods, to obtain data of the orientation/motion status, so that the mobile terminal determines and uses a correct voice collection apparatus. In this case, in multiple continuous measurement periods, the mobile terminal determines, according to change rates of data of the orientation/motion status of the sensors and various suitable preset thresholds and preset ranges, the voice collection apparatus for voice collection.

According to the speech recognition method provided in this embodiment of the present disclosure, a mobile terminal can acquire an orientation/motion status of the mobile terminal, and determine, according to a proximity distance, a proximity distance change rate, a horizontal tilt, a horizontal tilt change rate, an acceleration change rate, and an azimuth change rate in the orientation/motion status, a voice collection apparatus for voice collection; when the proximity distance is less than or equal to a first threshold, the proximity distance change rate is less than or equal to a second threshold, the horizontal tilt is within a preset range, the horizontal tilt change rate is less than or equal to a third threshold, the acceleration change rate is less than or equal to a fourth threshold, and the azimuth change rate is less than or equal to a fifth threshold, the mobile terminal collects voice using a microphone array in the mobile terminal; or when the proximity distance is greater than a first threshold, the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, the mobile terminal collects voice using a wearable voice collection apparatus, acquires a speech signal from the wearable voice collection apparatus, and recognizes the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal. In this way, it is avoided that resource consumption occurs in a process of collecting, by a mobile terminal, voice using an unsuitable voice collection apparatus in different scenarios, and a precision rate of speech recognition is improved. In addition, to avoid that a working mode determined according to a proximity distance and a proximity distance change rate is insufficiently accurate, in this embodiment of the present disclosure, the orientation/motion status is optimized, more detailed data of the orientation/motion status is acquired, and a suitable voice collection apparatus for voice collection is determined according to a proximity distance, a proximity distance change rate, a horizontal tilt, a horizontal tilt change rate, an acceleration change rate, and an azimuth change rate, which further improves a precision rate of speech recognition.

Figure 3D:
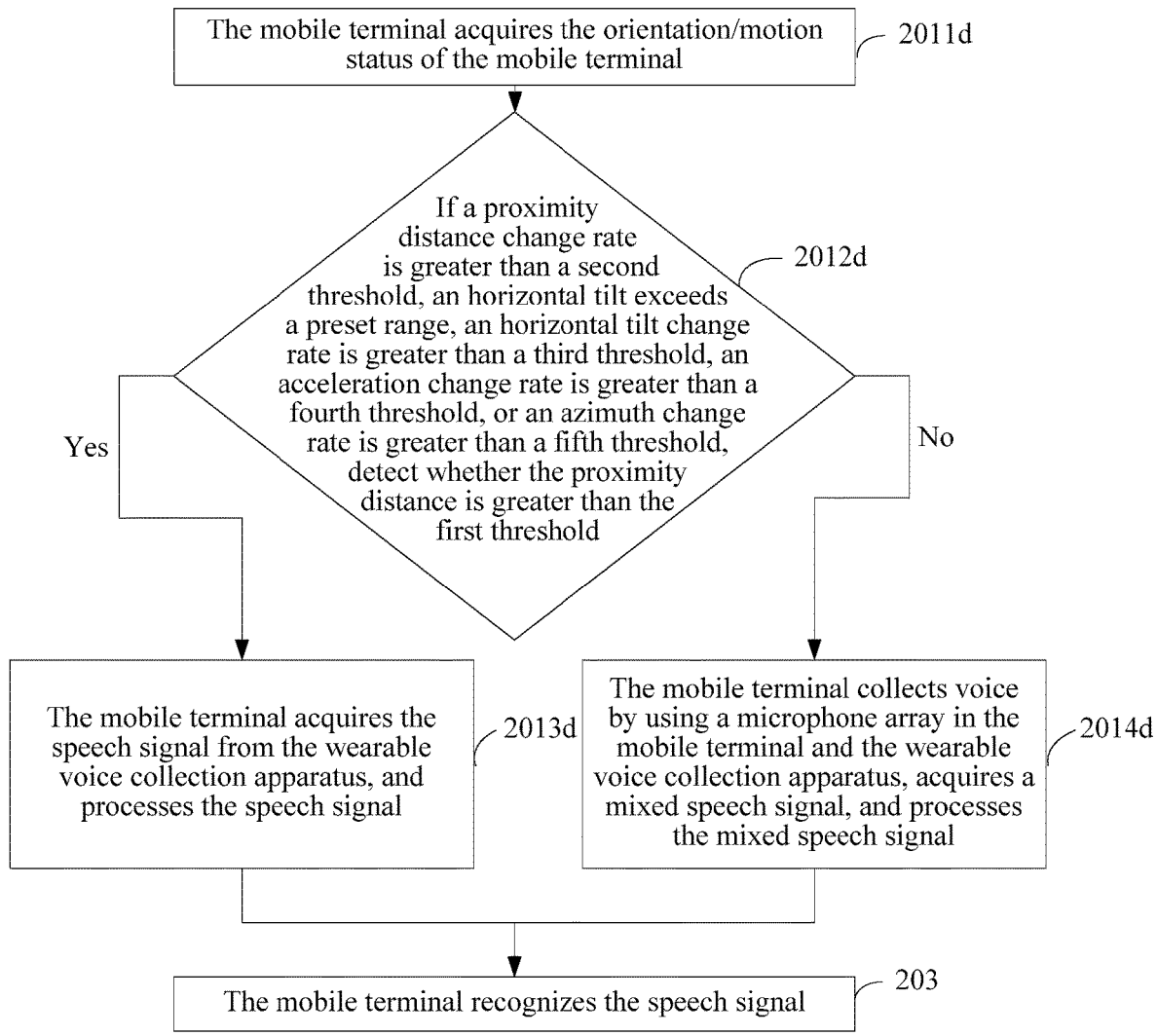
FIG. 3D is a flowchart of yet another specific implementation manner of a speech recognition method according to an embodiment of the present disclosure.

Further, in a specific implementation manner, based on the solution shown in FIG. 2A, this embodiment of the present disclosure further provides a specific solution of the speech recognition method, and in this solution, the orientation/motion status includes a proximity distance, a proximity distance change rate, a horizontal tilt, a horizontal tilt change rate, an acceleration change rate, and an azimuth change rate. In this solution, a process of performing step 201 in the solution shown in FIG. 2A is described in further detail, and step 201 may be implemented as steps 2011*d* to 2014*d*. As shown in FIG. 3D, step 201 includes:

2011*d*. The mobile terminal acquires the orientation/motion status of the mobile terminal.

The orientation/motion status includes a proximity distance, a proximity distance change rate, a horizontal tilt, a horizontal tilt change rate, an acceleration change rate, and an azimuth change rate.

2012*d*. If the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, detect whether the proximity distance is greater than the first threshold.

The first threshold, the second threshold, the third threshold, the fourth threshold, the fifth threshold, and the preset range of the horizontal tilt may be set by the user according to an actual case, or may be automatically set by the mobile terminal according to a history record.

2013*d*. If the proximity distance is greater than the first threshold, the mobile terminal acquires the speech signal from the wearable voice collection apparatus, and processes the speech signal.

2014*d*. If the proximity distance is less than or equal to the first threshold, the mobile terminal collects voice using the microphone array in the mobile terminal and the wearable voice collection apparatus, acquires a mixed speech signal, and processes the mixed speech signal.

The mixed speech signal is obtained by converting voice collected by the microphone array in the mobile terminal and the wearable voice collection apparatus. The mobile terminal simultaneously receives speech signals collected by the microphone array in the mobile terminal and the wearable voice collection apparatus, and performs a subtraction operation to subtract the speech signal collected by the wearable voice collection apparatus from the speech signal collected by the microphone array, to effectively eliminate noise, and reserve a speech signal of a user.

Figure 4:
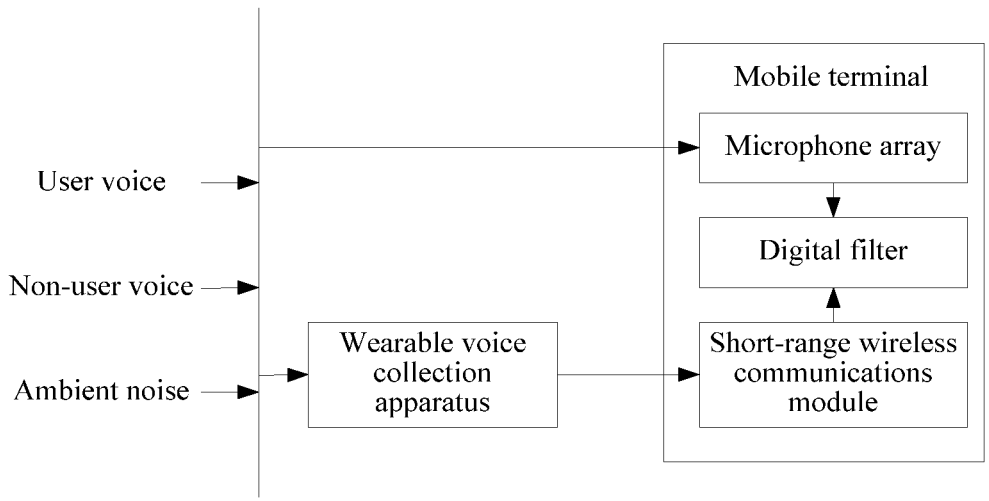
FIG. 4 is a diagram of an operating principle of acquiring a speech signal by simultaneously using a wearable voice collection apparatus and a microphone array according to an embodiment of the present disclosure.

FIG. 4 shows a working principle of simultaneously receiving, by the mobile terminal, speech signals collected by the microphone array in the mobile terminal and the wearable voice collection apparatus. The microphone array in the mobile terminal and the wearable voice collection apparatus collect user voice, non-user voice, and ambient noise. User voice, non-user voice, and ambient noise collected by the microphone array in the mobile terminal are transferred to a digital filter, and at the same time user voice, non-user voice, and ambient noise collected by the wearable voice collection apparatus are transferred to the digital filter using a short-range wireless communications module. The wearable voice collection apparatus is usually insensitive to non-user voice and ambient noise; therefore, voice collected by the wearable voice collection apparatus includes less non-user voice and ambient noise. The two channels of collected voice are provided to the digital filter, non-user voice and ambient noise are eliminated using a time-domain Fourier transform filtering operation, and a relatively clean speech signal of a user is output. In a subsequent process, a speech waveform of the user may be obtained by means of time-domain inverse Fourier transform of an application program, to perform a subsequent process of voiceprint recognition and semantic recognition.

It should be noted that when the mobile terminal simultaneously receives the speech signals collected by the microphone array in the mobile terminal and the wearable voice collection apparatus, the mobile terminal maintains a connection to the wearable voice collection apparatus, and the mobile terminal may supply electric power to the wearable voice collection apparatus by means of short-range wireless charging, to compensate for the shortage in energy supply of the wearable voice collection apparatus. This manner of supplying electric power may be implemented by configuring a short-range wireless charging module and an energy storage module for the wearable voice collection apparatus.

It should be noted that in this embodiment of the present disclosure, specifically, a correspondence between data measured by each sensor and a voice collection apparatus for voice collection is shown in Table 4:

TABLE 4

| Proximity sensor | Acceleration sensor | Electronic compass sensor | Voice collection apparatus for voice collection |
|---|---|---|---|
| In a measurement period, an average value of proximity distances is less than or equal to a first threshold, and a proximity distance change rate is less than or equal to a second threshold | In a measurement period, an average value of horizontal tilts is within a preset range, a horizontal tilt change rate is less than or equal to a third threshold, and an acceleration change rate is less than or equal to a fourth threshold | In a measurement period, an azimuth change rate is less than or equal to a fifth threshold | Microphone array |
| | In a measurement period, an average value of horizontal tilts exceeds a preset range, a horizontal tilt change rate is less than or equal to a third threshold, and an acceleration change rate is less than or equal to a fourth threshold | Any case | Microphone array and wearable voice collection apparatus |
| | In a measurement period, an average value of horizontal tilts is within a preset range, a horizontal tilt change rate is greater than a third threshold, and an acceleration change rate is less than or equal to a fourth threshold | Any case | Microphone array and wearable voice collection apparatus |
| | In a measurement period, an average value of horizontal tilts is within a preset range, a horizontal tilt change rate is less than or equal to a third threshold, and an acceleration change rate is greater than a fourth threshold | Any case | Microphone array and wearable voice collection apparatus |
| | Any case | In a measurement period, an azimuth change rate is greater than a fifth threshold | Microphone array and wearable voice collection apparatus |
| In a measurement period, an average value of proximity distances is less than or equal to a first threshold, and a proximity distance change rate is greater than a second threshold | Any case | Any case | Microphone array and wearable voice collection apparatus |
| In a measurement period, an average value of proximity distances is greater than a first threshold, and a proximity distance change rate is less than or equal to a second threshold | Any case | Any case | Wearable voice collection apparatus |
| In a measurement period, an average value of proximity distances is greater than a first threshold, and a proximity | Any case | Any case | Wearable voice collection apparatus |

TABLE 4-continued

| Proximity sensor | Acceleration sensor | Electronic compass sensor | Voice collection apparatus for voice collection |
|---|---|---|---|
| distance change rate is greater than a second threshold | | | |

According to the speech recognition method provided in this embodiment of the present disclosure, a mobile terminal can acquire an orientation/motion status of the mobile terminal, and determine, according to a proximity distance, a proximity distance change rate, a horizontal tilt, a horizontal tilt change rate, an acceleration change rate, and an azimuth change rate in the orientation/motion status, a voice collection apparatus for voice collection; when the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, the mobile terminal detects whether the proximity distance is greater than a first threshold; and if the proximity distance is greater than the first threshold, the mobile terminal acquires a speech signal from a wearable voice collection apparatus, and if the proximity distance is less than or equal to the first threshold, the mobile terminal collects voice using a microphone array in the mobile terminal and a wearable voice collection apparatus, acquires a mixed speech signal, and recognizes the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal. In this way, it is avoided that resource consumption occurs in a process of collecting, by a mobile terminal, voice using an unsuitable voice collection apparatus in different scenarios, and a precision rate of speech recognition is improved. In addition, to avoid that a working mode determined according to a proximity distance and a proximity distance change rate is insufficiently accurate, in this embodiment of the present disclosure, the orientation/motion status is optimized, more detailed data of the orientation/motion status is acquired, and a suitable voice collection apparatus for voice collection is determined according to a proximity distance, a proximity distance change rate, a horizontal tilt, a horizontal tilt change rate, an acceleration change rate, and an azimuth change rate, which further improves a precision rate of speech recognition. Moreover, in a case in which there is a moderate distance between a mobile terminal and a user, or in a case in which an error may be caused when only a microphone array or only a wearable voice collection apparatus is used, a mixed speech signal is acquired from a microphone array or a wearable voice collection apparatus, which further improves a precision rate of speech recognition.

Figure 5A:
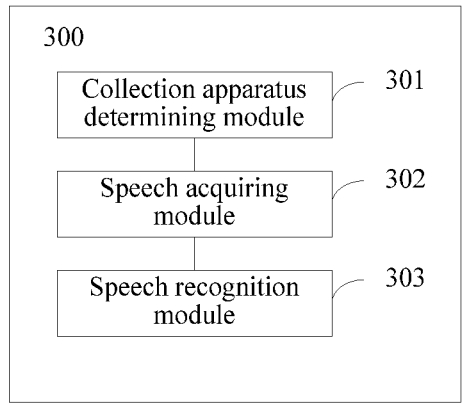
FIG. 5A is a schematic structural diagram of a mobile terminal according to an embodiment of the present disclosure.

An embodiment of the present disclosure provides a mobile terminal 300, the mobile terminal 300 includes a microphone array, and as shown in FIG. 5A, the mobile terminal 300 includes a collection apparatus determining module 301 configured to acquire an orientation/motion status of the mobile terminal, and determine, according to the orientation/motion status, a voice collection apparatus for voice collection.

The orientation/motion status indicates an orientation or a motion status of the mobile terminal. The voice collection apparatus includes a wearable voice collection apparatus or the microphone array. The collection apparatus may include a speech acquiring module 302 configured to acquire a speech signal from the voice collection apparatus.

The speech signal is obtained by converting voice collected by the voice collection apparatus. A speech recognition module 303 configured to perform recognition, which may be voiceprint recognition and semantic recognition, on the speech signal. According to the mobile terminal provided in this embodiment of the present disclosure, the mobile terminal can acquire an orientation/motion status of the mobile terminal, and determine, according to the orientation/motion status, a voice collection apparatus for voice collection; acquire a speech signal from the voice collection apparatus; and recognize the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal, which improves a precision rate of speech recognition.

Figure 5B:
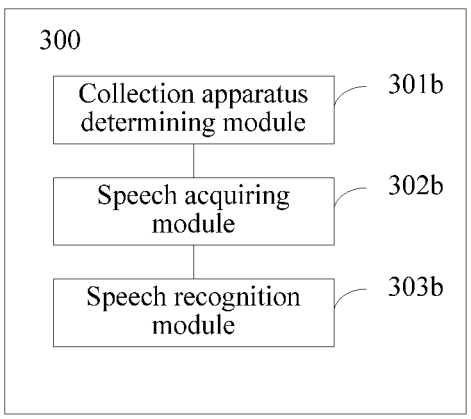
FIG. 5B is a schematic structural diagram of a mobile terminal according to an embodiment of the present disclosure.

In a specific embodiment, in a case in which the orientation/motion status of the mobile terminal 300 is a distance between the mobile terminal 300 and a user, as shown in FIG. 5B, the mobile terminal 300 includes a collection apparatus determining module 301b configured to acquire a distance to a user, and determine, according to the distance to the user, a voice collection apparatus for voice collection, where the voice collection apparatus includes the microphone array in the mobile terminal or a wearable voice collection apparatus.

During implementation, in an embodiment, the collection apparatus determining module 301b detects the distance to the user using a sensor. For example, the distance between the mobile terminal and the user is determined by detecting a moving status or a location of the user. Alternatively, the user carries an accessory module, and the distance between the mobile terminal and the user is determined by detecting a distance between the mobile terminal and the module. In a specific application of this embodiment, in a manner, the distance to the user is determined, and if the distance to the user is less than a distance threshold, it is determined that voice is to be collected using the microphone array, and in another manner, the distance to the user is determined, and if the distance to the user is not less than a distance threshold, it is determined that voice is to be collected using the wearable voice collection apparatus. The collection apparatus may include: a speech acquiring module 302b configured to acquire a speech signal from the voice collection apparatus, where the speech signal is obtained by converting voice collected by the voice collection apparatus; and a speech recognition module 303b configured to recognize the speech signal.

If voice is to be collected using the wearable voice collection apparatus, the wearable voice collection apparatus may be an electronic skin tattoo worn on the throat of a user, or may be a bone conduction microphone worn in a cochlea. The speech signal may be recognized by means of voiceprint recognition and semantic recognition, and in this embodiment, the mobile terminal can recognize voice more accurately, and also determine a voice source more accurately.

Further, during implementation of a specific solution, the orientation/motion status includes at least a proximity distance.

The collection apparatus determining module 301 is configured to acquire the proximity distance, and if the proximity distance is less than or equal to a first threshold, determine to collect voice using the microphone array.

The collection apparatus determining module 301 is configured to acquire the proximity distance, and if the proximity distance is greater than a first threshold, determine to collect voice using the wearable voice collection apparatus.

According to the mobile terminal provided in this embodiment of the present disclosure, the mobile terminal can acquire an orientation/motion status of the mobile terminal, where the orientation/motion status includes at least a proximity distance; when the proximity distance is less than or equal to a first threshold, the mobile terminal collects voice using a microphone array in the mobile terminal, and acquires a speech signal from the microphone array; or when the proximity distance is greater than a first threshold, the mobile terminal collects voice using a wearable voice collection apparatus, acquires a speech signal from the wearable voice collection apparatus, and recognizes the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal. In this way, it is avoided that resource consumption occurs in a process of collecting, by a mobile terminal, voice using an unsuitable voice collection apparatus in different scenarios, and a precision rate of speech recognition is improved.

Further, during implementation of another specific solution, the orientation/motion status includes a proximity distance and a proximity distance change rate.

The collection apparatus determining module 301 is configured to acquire the proximity distance and the proximity distance change rate, and if the proximity distance is less than or equal to a first threshold and the proximity distance change rate is less than or equal to a second threshold, determine to collect voice using the microphone array.

The collection apparatus determining module 301 is further configured to acquire the proximity distance and the proximity distance change rate, and if the proximity distance is greater than a first threshold or the proximity distance change rate is greater than a second threshold, determine to collect voice using the wearable voice collection apparatus.

According to the mobile terminal provided in this embodiment of the present disclosure, the mobile terminal can acquire an orientation/motion status of the mobile terminal, and determine, according to a proximity distance and a proximity distance change rate in the orientation/motion status, a voice collection apparatus for voice collection; when the proximity distance is less than or equal to a first threshold and the proximity distance change rate is less than or equal to a second threshold, the mobile terminal collects voice using a microphone array in the mobile terminal, and acquires a speech signal from the microphone array; or when the proximity distance is greater than a first threshold or the proximity distance change rate is greater than a second threshold, the mobile terminal collects voice using a wearable voice collection apparatus, acquires a speech signal from the wearable voice collection apparatus, and recognizes the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal. In this way, it is avoided that resource consumption occurs in a process of collecting, by a mobile terminal, voice using an unsuitable voice collection apparatus in different scenarios, and a precision rate of speech recognition is improved.

Optionally, during implementation of still another specific solution, the orientation/motion status includes a proximity distance, a proximity distance change rate, a horizontal tilt, a horizontal tilt change rate, an acceleration change rate, and an azimuth change rate.

The collection apparatus determining module 301 is configured to acquire the proximity distance, the proximity distance change rate, the horizontal tilt, the horizontal tilt change rate, the acceleration change rate, and the azimuth change rate, and if the proximity distance is less than or equal to a first threshold, the proximity distance change rate is less than or equal to a second threshold, the horizontal tilt is within a preset range, the horizontal tilt change rate is less than or equal to a third threshold, the acceleration change rate is less than or equal to a fourth threshold, and the azimuth change rate is less than or equal to a fifth threshold, determine to collect voice using the microphone array.

Alternatively, the collection apparatus determining module 301 is further configured to acquire the proximity distance, the proximity distance change rate, the horizontal tilt, the horizontal tilt change rate, the acceleration change rate, and the azimuth change rate, and if the proximity distance is greater than a first threshold, the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, determine to collect voice using the wearable voice collection apparatus.

According to the mobile terminal provided in this embodiment of the present disclosure, the mobile terminal can acquire an orientation/motion status of the mobile terminal, and determine, according to a proximity distance, a proximity distance change rate, a horizontal tilt, a horizontal tilt change rate, an acceleration change rate, and an azimuth change rate in the orientation/motion status, a voice collection apparatus for voice collection; when the proximity distance is less than or equal to a first threshold, the proximity distance change rate is less than or equal to a second threshold, the horizontal tilt is within a preset range, the horizontal tilt change rate is less than or equal to a third threshold, the acceleration change rate is less than or equal to a fourth threshold, and the azimuth change rate is less than or equal to a fifth threshold, the mobile terminal collects voice using a microphone array in the mobile terminal; or when the proximity distance is greater than a first threshold, the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, the mobile terminal collects voice using a wearable voice collection apparatus, acquires a speech signal from the wearable voice collection apparatus, and recognizes the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal. In this way, it is avoided that resource consumption occurs in a process of collecting, by a mobile terminal, voice using an unsuitable voice collection apparatus in different scenarios, and a precision rate of speech recognition is improved. In addition, to avoid that a working mode determined according to a proximity distance and a proximity distance change rate is insufficiently accurate, in this embodiment of the present disclosure, the orientation/motion status is optimized, more detailed data of the orientation/motion status is acquired, and a suitable voice collection apparatus for voice collection is determined according to a proximity distance, a proximity distance change rate, a horizontal tilt, a horizontal tilt change rate, an acceleration change rate, and an azimuth change rate, which further improves a precision rate of speech recognition.

Optionally, during implementation of yet another specific solution, the orientation/motion status includes a proximity distance, a proximity distance change rate, a horizontal tilt, a horizontal tilt change rate, an acceleration change rate, and an azimuth change rate.

The collection apparatus determining module 301 is configured to: acquire the proximity distance, the proximity distance change rate, the horizontal tilt, the horizontal tilt change rate, the acceleration change rate, and the azimuth change rate, if the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, detect whether the proximity distance is greater than a first threshold, and if the proximity distance is greater than the first threshold, determine to collect voice using the wearable voice collection apparatus.

Alternatively, the collection apparatus determining module 301 is configured to acquire the proximity distance, the proximity distance change rate, the horizontal tilt, the horizontal tilt change rate, the acceleration change rate, and the azimuth change rate, if the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, detect whether the proximity distance is greater than a first threshold, and if the proximity distance is less than or equal to the first threshold, determine to collect voice using the microphone array in the mobile terminal and the wearable voice collection apparatus, and acquire a mixed speech signal.

According to the mobile terminal provided in this embodiment of the present disclosure, the mobile terminal can acquire an orientation/motion status of the mobile terminal, and determine, according to a proximity distance, a proximity distance change rate, a horizontal tilt, a horizontal tilt change rate, an acceleration change rate, and an azimuth change rate in the orientation/motion status, a voice collection apparatus for voice collection; when the proximity distance change rate is greater than a second threshold, the horizontal tilt exceeds a preset range, the horizontal tilt change rate is greater than a third threshold, the acceleration change rate is greater than a fourth threshold, or the azimuth change rate is greater than a fifth threshold, the mobile terminal detects whether the proximity distance is greater than a first threshold; and if the proximity distance is greater than the first threshold, the mobile terminal acquires a speech signal from a wearable voice collection apparatus, or if the proximity distance is less than or equal to the first threshold, the mobile terminal collects voice using a microphone array in the mobile terminal and a wearable voice collection apparatus, acquires a mixed speech signal, and recognizes the speech signal. Compared with the prior art in which a speech signal is acquired from an electronic skin tattoo regardless of a distance between a user and a mobile terminal, in this solution, a suitable voice collection apparatus is selected according to an orientation/motion status of a mobile terminal, and voice is collected using the suitable voice collection apparatus in different scenarios, to obtain a speech signal. In this way, it is avoided that resource consumption occurs in a process of collecting, by a mobile terminal, voice using an unsuitable voice collection apparatus in different scenarios, and a precision rate of speech recognition is improved. In addition, to avoid that a working mode determined according to a proximity distance and a proximity distance change rate is insufficiently accurate, in this embodiment of the present disclosure, the orientation/motion status is optimized, more detailed data of the orientation/motion status is acquired, and a suitable voice collection apparatus for voice collection is determined according to a proximity distance, a proximity distance change rate, a horizontal tilt, a horizontal tilt change rate, an acceleration change rate, and an azimuth change rate, which further improves a precision rate of speech recognition. Moreover, in a case in which there is a moderate distance between a mobile terminal and a user, or in a case in which it is unsuitable to use only a microphone array or only a wearable voice collection apparatus, a mixed speech signal is acquired from a microphone array or a wearable voice collection apparatus, which further improves a precision rate of speech recognition.

Figure 6:
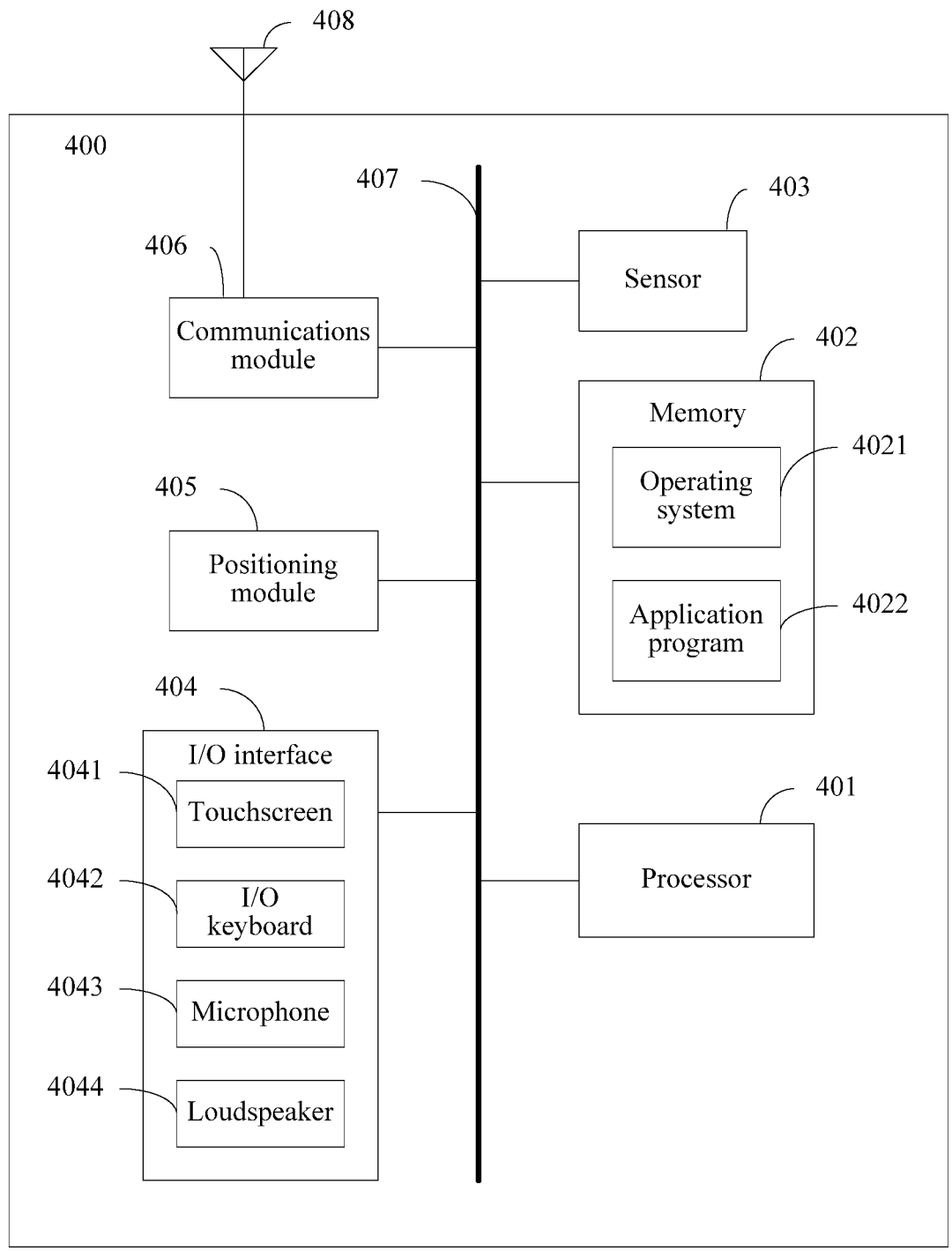
FIG. 6 is a schematic structural diagram of a smartphone according to an embodiment of the present disclosure.

An embodiment of the present disclosure further provides a smartphone 400. As shown in FIG. 6, it should be understood that the smartphone 400 shown in FIG. 6 is only an example of the mobile terminal, and the smartphone 400 may have more or fewer components than these shown in FIG. 6, may combine two or more components, or may have a different component configuration. The components shown in FIG. 6 may be implemented by hardware that includes one or more signal processors and/or application-specific integrated circuits, software, or a combination of hardware and software.

A smartphone 400 is used as an example to provide a detailed description. As shown in FIG. 6, the smartphone 400 includes at least one processor 401, a memory 402, a sensor 403, an input/output (I/O) interface 404, a positioning module 405, a communications module 406, at least one communications bus 407, and a communications antenna 408. The smartphone 400 further includes other functional components such as a battery module, a wired/wireless charging interface, and the like. The communication bus 407 is configured to implement connection and communication between these components. The memory 402 may include a non-volatile solid-state memory and/or a dynamic non-volatile storage device such as a flash memory or a rotatable hard disk drive. The sensor 403 includes various sensors such as a proximity sensor, an acceleration sensor, an electronic compass sensor, a light sensor, and the like configured to measure orientation/motion status information of the smartphone 400. The positioning module 405 may be configured to perform functions such as Global Positioning System (GPS) positioning, WLAN positioning, and base station positioning, to acquire geographical information such as a location and a height, and the like of the smartphone 400. The communications module 406 may be configured to perform long-range communication, for example, Global System for Mobile communication (GSM), Code Division Multiple Access (CDMA), General Packet Radio Service (GPRS), and Enhanced Data Rate for GSM Evolution (EDGE), third generation (3G) technologies such as Wideband Code Division Multiple Access (WCDMA) and Time Division-Synchronous Code Division Multiple Access (TD-SCDMA), and fourth generation (4G) technologies such as Long Term Evolution (LTE). The communications module 406 may further be configured to perform short-range communication, and may perform short-range wireless communication with another mobile intelligent terminal or a wearable voice collection apparatus within a short range, for example, ZigBee®, UWB, Wi-Fi, Bluetooth®, NFC, and infrared communications. The communications antenna 408 is configured to receive and send a communication signal.

The I/O interface 404 includes a touchscreen 4041 for displaying and inputting, an I/O keyboard 4042 (optional) for inputting, a microphone 4043, that is, the foregoing microphone array, a loudspeaker 4044, and the like.

The memory 402 includes an operating system 4021 and an application program 4022. The operating system 4021 includes various operating system programs, and is configured to implement various hardware-based operations. The application program 4022 includes various application programs configured to implement functions of various applications. For example, a speech recognition program or a speech assistance program can perform security authentication of a user according to a voiceprint characteristic of speech input of the user, and can also parse out a semantic meaning from an input speech signal of a user to perform a corresponding function and operation such as photographing, searching contacts for a user according to the semantic meaning and making a call or sending a short message service message, or answering a call or replying to a short message service message.

The memory 402 may be configured to store an orientation/motion status, where the orientation/motion status includes at least a proximity distance and a proximity distance change rate, and may further include a horizontal tilt, a horizontal tilt change rate, an acceleration change rate, and an azimuth change rate, and may further be configured to store voice collected by a voice collection apparatus and a speech signal acquired from the voice collection apparatus.

Further, the memory 402 may further be configured to store a first threshold, a second threshold, a third threshold, a fourth threshold, a fifth threshold, and a preset range of the horizontal tilt.

Optionally, the memory 402 may further be configured to store a mixed speech signal.

The processor 401 communicates with various modules and components using the bus 407. The sensor 403 detects and acquires the orientation/motion status, and the processor 401 determines the voice collection apparatus according to the method in the foregoing embodiments. If it is determined that the voice collection apparatus is a microphone array, voice is acquired using the microphone 4043, and the voice is converted into a speech signal and the speech signal is transmitted to the processor 401; or if it is determined that the voice collection apparatus is a wearable voice collection apparatus, voice collected by the wearable voice collection apparatus is received using the antenna 408, the voice is converted into a speech signal, and the speech signal is transmitted to the processor 401.

According to the smartphone provided in this embodiment of the present disclosure, the smartphone can acquire an orientation/motion status of the smartphone; may determine, according to a proximity distance in the orientation/motion status, whether a voice collection apparatus for voice collection is a microphone array or a wearable voice collection apparatus, and acquire a speech signal from the voice collection apparatus; or may determine, according to a proximity distance and a proximity distance change rate in the orientation/motion status, whether a voice collection apparatus for voice collection is a microphone array or a wearable voice collection apparatus, and acquire a speech signal from the voice collection apparatus; or may determine, according to a proximity distance, a proximity distance change rate, a horizontal tilt, a horizontal tilt change rate, an acceleration change rate, and an azimuth change rate in the orientation/motion status, whether a voice collection apparatus for voice collection is a microphone array or a wearable voice collection apparatus, acquire a speech signal from the voice collection apparatus, and recognize the speech signal. Compared with the prior art in which a speech signal is acquired from an electronic skin tattoo regardless of a distance between a user and a smartphone, in this solution, a suitable voice collection apparatus is selected according to an orientation/motion status of the smartphone, and voice is collected using the suitable voice collection apparatus in different scenarios, to obtain a speech signal. In this way, it is avoided that resource consumption occurs in a process of collecting, by a smartphone, voice using an unsuitable voice collection apparatus in different scenarios, and a precision rate of speech recognition is improved. In addition, to avoid that a working mode determined according to a proximity distance and a proximity distance change rate is insufficiently accurate, in this embodiment of the present disclosure, the orientation/motion status is optimized, more detailed data of the orientation/motion status is acquired, and a suitable voice collection apparatus for voice collection is determined according to a proximity distance, a proximity distance change rate, a horizontal tilt, a horizontal tilt change rate, an acceleration change rate, and an azimuth change rate, which further improves a precision rate of speech recognition. Moreover, in a case in which there is a moderate distance between a mobile terminal and a user, or in a case in which an error may be caused when only a microphone array or only a wearable voice collection apparatus is used, a mixed speech signal is acquired from a microphone array or a wearable voice collection apparatus, which further improves a precision rate of speech recognition.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A speech recognition method, comprising:
   acquiring, by a mobile terminal, a proximity distance of the mobile terminal to a user;
   selecting a voice collection apparatus from a plurality of voice collection apparatuses for voice collection based on the proximity distance being less than a first threshold, a proximity distance change rate of the mobile terminal being less than a second threshold, and at least one of a horizontal tilt change rate of the mobile terminal, an acceleration change rate of the mobile terminal, or an azimuth change rate of the mobile terminal, wherein the plurality of voice collection apparatuses comprise at least a microphone array in the mobile terminal and a wearable voice collection apparatus;
   acquiring, by the mobile terminal, a speech signal from the voice collection apparatus, the speech signal obtained by converting voice collected by the voice collection apparatus; and
   recognizing, by the mobile terminal, the speech signal.

2. The speech recognition method of claim 1, wherein selecting the voice collection apparatus comprises:
   determining whether the proximity distance is less than the first threshold; and
   determining to use the microphone array as the voice collection apparatus when the proximity distance is less than the first threshold, wherein acquiring the speech signal from the voice collection apparatus comprises acquiring, by the mobile terminal, the speech signal using the microphone array in the mobile terminal, and wherein the speech signal is obtained by converting voice collected by the microphone array.

3. The speech recognition method of claim 2, wherein selecting the voice collection apparatus comprises:
   determining whether the proximity distance is less than the first threshold; and
   determining to use the wearable voice collection apparatus as the voice collection apparatus when the proximity distance is not less than the first threshold, wherein acquiring the speech signal from the voice collection apparatus comprises acquiring, by the mobile terminal, the speech signal using the wearable voice collection apparatus, wherein the speech signal is obtained by converting voice collected by the wearable voice collection apparatus, and wherein recognizing the speech signal comprises performing, by the mobile terminal, voiceprint recognition and semantic recognition on acquiring the speech signal.

4. The speech recognition method of claim 1, further comprising determining at least one of the horizontal tilt change rate of the mobile terminal based on first multiple measurements, the acceleration change rate of the mobile terminal based on second multiple measurements, or the azimuth change rate of the mobile terminal based on third multiple measurements, wherein the horizontal tilt change rate corresponds to an amount of horizontal change per unit time within which the first multiple measurements are measured, wherein the acceleration change rate corresponds to an amount of change of acceleration per unit time within which the second multiple measurements are measured, and wherein the azimuth change rate corresponds to an amount of azimuthal change per unit time within which the third multiple measurements are made.

5. A speech recognition method, comprising:
   acquiring, by a mobile terminal, an orientation/motion status of the mobile terminal, wherein the orientation/motion status comprises at least a proximity distance and a proximity distance change rate;
   selecting, based on the orientation/motion status, a microphone array of the mobile terminal as a voice collection apparatus from a plurality of voice collection apparatuses for voice collection when the proximity distance is less than or equal to a first threshold and the proximity distance change rate is less than or equal to a second threshold, wherein the orientation/motion status indicates an orientation or a motion status of the mobile terminal, and wherein the plurality of voice collection apparatuses comprises at least the microphone array in the mobile terminal and a wearable voice collection apparatus;
   collecting, by the mobile terminal, voice using the microphone array in the mobile terminal when the proximity distance is less than or equal to the first threshold and the proximity distance change rate is less than or equal to the second threshold;
   acquiring, by the mobile terminal, a speech signal from the voice collection apparatus, the speech signal obtained by converting voice collected by the voice collection apparatus; and
   recognizing, by the mobile terminal, the speech signal.

6. The speech recognition method of claim 5, further comprising:
   collecting, by the mobile terminal, voice using the wearable voice collection apparatus when the proximity distance is greater than the first threshold or the proximity distance change rate is greater than the second threshold;
   acquiring the speech signal from the wearable voice collection apparatus; and
   processing the speech signal.

7. The speech recognition method of claim 5, wherein the orientation/motion status further comprises a horizontal tilt of the mobile terminal, a horizontal tilt change rate of the mobile terminal, an acceleration change rate of the mobile terminal, and an azimuth change rate of the mobile terminal, and wherein the method further comprises:
   collecting, by the mobile terminal, voice using the microphone array in the mobile terminal when the proximity distance is less than or equal to the first threshold, wherein the proximity distance change rate is less than or equal to the second threshold, wherein the horizontal tilt is within a preset range, wherein the horizontal tilt change rate is less than or equal to a third threshold, wherein the acceleration change rate is less than or equal to a fourth threshold, and wherein the azimuth change rate is less than or equal to a fifth threshold; and
   acquiring the speech signal from the microphone array in the mobile terminal.

8. The speech recognition method of claim 5, wherein the orientation/motion status further comprises a horizontal tilt of the mobile terminal, a horizontal tilt change rate of the mobile terminal, an acceleration change rate of the mobile terminal, and an azimuth change rate of the mobile terminal, and wherein the method further comprises:
  collecting, by the mobile terminal, voice using the wearable voice collection apparatus when either the proximity distance is greater than the first threshold, the proximity distance change rate is greater than the second threshold, the horizontal tilt exceeds a preset range, the horizontal tilt change rate is greater than a third threshold, the acceleration change rate is greater than a fourth threshold, or the azimuth change rate is greater than a fifth threshold;
  acquiring the speech signal from the wearable voice collection apparatus; and
  processing the speech signal.

9. The speech recognition method of claim 5, wherein the orientation/motion status further comprises a horizontal tilt of the mobile terminal, a horizontal tilt change rate of the mobile terminal, an acceleration change rate of the mobile terminal, and an azimuth change rate of the mobile terminal, and wherein the method further comprises:
  detecting whether the proximity distance is greater than the first threshold when either the proximity distance change rate is greater than the second threshold, the horizontal tilt exceeds a preset range, the horizontal tilt change rate is greater than a third threshold, the acceleration change rate is greater than a fourth threshold, or the azimuth change rate is greater than a fifth threshold;
  acquiring, by the mobile terminal, the speech signal from the wearable voice collection apparatus when the proximity distance is greater than the first threshold; and
  processing the speech signal.

10. The speech recognition method of claim 5, wherein the orientation/motion status further comprises a horizontal tilt of the mobile terminal, a horizontal tilt change rate of the mobile terminal, an acceleration change rate of the mobile terminal, and an azimuth change rate of the mobile terminal, and wherein determining the method further comprises:
  detecting whether the proximity distance is greater than the first threshold when either the proximity distance change rate is greater than the second threshold, the horizontal tilt exceeds a preset range, the horizontal tilt change rate is greater than a third threshold, the acceleration change rate is greater than a fourth threshold, or the azimuth change rate is greater than a fifth threshold;
  collecting, by the mobile terminal, voice using the microphone array in the mobile terminal and the wearable voice collection apparatus when the proximity distance is less than or equal to the first threshold;
  acquiring a mixed speech signal; and
  processing the mixed speech signal, wherein the mixed speech signal is obtained by converting voice collected by the microphone array in the mobile terminal and the wearable voice collection apparatus.

11. A mobile terminal, comprising:
  a microphone array; and
  a processor coupled to the microphone array and configured to:
    acquire a proximity distance of the mobile terminal to a user;
    select a voice collection apparatus from a plurality of voice collection apparatuses for voice collection based on the proximity distance being less than a first threshold, a proximity distance change rate of the mobile terminal being less than a second threshold, and an acceleration change rate of the mobile terminal, wherein the plurality of voice collection apparatuses comprises at least the microphone array in the mobile terminal and a wearable voice collection apparatus;
    acquire a speech signal from the voice collection apparatus, wherein the speech signal is obtained by converting voice collected by the voice collection apparatus; and
    recognize the speech signal.

12. The mobile terminal of claim 11, wherein the processor is further configured to:
  determine whether the proximity distance is less than the first threshold;
  determine to use the microphone array as the voice collection apparatus when the proximity distance is less than the first threshold; and
  acquire the speech signal using the microphone array in the mobile terminal, and wherein the speech signal is obtained by converting voice collected by the microphone array.

13. The mobile terminal of claim 11, wherein the processor is further configured to:
  determine whether the proximity distance is less than the first threshold;
  determine to use the wearable voice collection apparatus as the voice collection apparatus when the proximity distance is not less than the first threshold;
  acquire the speech signal using the wearable voice collection apparatus, wherein the speech signal is obtained by converting voice collected by the wearable voice collection apparatus; and
  perform voiceprint recognition and semantic recognition on acquiring the speech signal.

14. A mobile terminal, comprising:
  a microphone array; and
  a processor coupled to the microphone array and configured to:
    acquire an orientation/motion status of the mobile terminal, the orientation/motion status comprises at least a proximity distance and a proximity distance change rate;
    select, based on the orientation/motion status, a voice collection apparatus from a plurality of voice collection apparatuses for voice collection, wherein the orientation/motion status indicates an orientation or a motion status of the mobile terminal, and wherein the plurality of voice collection apparatuses comprises at least a wearable voice collection apparatus and the microphone array;
    determine to collect voice using the microphone array when the proximity distance is less than or equal to a first threshold and the proximity distance change rate is less than or equal to a second threshold;
    acquire a speech signal from the voice collection apparatus, wherein the speech signal is obtained by converting voice collected by the voice collection apparatus; and
    recognize the speech signal.

15. The mobile terminal of claim 14, wherein the processor is further configured to determine to collect voice using the wearable voice collection apparatus when the proximity distance is greater than the first threshold or the proximity distance change rate is greater than the second threshold.

16. The mobile terminal of claim 14, wherein the orientation/motion status further comprises a horizontal tilt of the mobile terminal, a horizontal tilt change rate of the mobile terminal, an acceleration change rate of the mobile terminal, and an azimuth change rate of the mobile terminal, and wherein the processor is further configured to:
- acquire the proximity distance, the proximity distance change rate, the horizontal tilt, the horizontal tilt change rate, the acceleration change rate, and the azimuth change rate; and
- determine to collect voice using the microphone array when the proximity distance is less than or equal to the first threshold, wherein the proximity distance change rate is less than or equal to the second threshold, wherein the horizontal tilt is within a preset range, wherein the horizontal tilt change rate is less than or equal to a third threshold, wherein the acceleration change rate is less than or equal to a fourth threshold, and wherein the azimuth change rate is less than or equal to a fifth threshold.

17. The mobile terminal of claim 14, wherein the orientation/motion status further comprises a horizontal tilt, a horizontal tilt change rate, an acceleration change rate, and an azimuth change rate, and wherein the processor is further configured to:
- acquire the proximity distance, the proximity distance change rate, the horizontal tilt, the horizontal tilt change rate, the acceleration change rate, and the azimuth change rate; and
- determine to collect voice using the wearable voice collection apparatus when either the proximity distance is greater than the first threshold, the proximity distance change rate is greater than the second threshold, the horizontal tilt exceeds a preset range, the horizontal tilt change rate is greater than a third threshold, the acceleration change rate is greater than a fourth threshold, or the azimuth change rate is greater than a fifth threshold.

18. The mobile terminal of claim 14, wherein the orientation/motion status further comprises a horizontal tilt of the mobile terminal, a horizontal tilt change rate of the mobile terminal, an acceleration change rate of the mobile terminal, and an azimuth change rate of the mobile terminal, and wherein the processor is further configured to:
- acquire the proximity distance, the proximity distance change rate, the horizontal tilt, the horizontal tilt change rate, the acceleration change rate, and the azimuth change rate;
- detect whether the proximity distance is greater than the first threshold when either the proximity distance change rate is greater than the second threshold, the horizontal tilt exceeds a preset range, the horizontal tilt change rate is greater than a third threshold, the acceleration change rate is greater than a fourth threshold, or the azimuth change rate is greater than a fifth threshold; and
- determine to collect voice using the wearable voice collection apparatus when the proximity distance is greater than the first threshold.

19. The mobile terminal of claim 14, wherein the orientation/motion status further comprises a horizontal tilt of the mobile terminal, a horizontal tilt change rate of the mobile terminal, an acceleration change rate of the mobile terminal, and an azimuth change rate of the mobile terminal, and wherein the processor is further configured to:
- acquire the proximity distance, the proximity distance change rate, the horizontal tilt, the horizontal tilt change rate, the acceleration change rate, and the azimuth change rate;
- detect whether the proximity distance is greater than the first threshold when either the proximity distance change rate is greater than the second threshold, the horizontal tilt exceeds a preset range, the horizontal tilt change rate is greater than a third threshold, the acceleration change rate is greater than a fourth threshold, or the azimuth change rate is greater than a fifth threshold;
- determine to collect voice using the microphone array in the mobile terminal and the wearable voice collection apparatus when the proximity distance is less than or equal to the first threshold; and
- acquire a mixed speech signal.

* * * * *